(12) United States Patent
Roppelt et al.

(10) Patent No.: US 12,468,614 B2
(45) Date of Patent: Nov. 11, 2025

(54) METHOD FOR DETERMINING HEAT-SINK CONTAMINATION BY MEANS OF ARTIFICIAL INTELLIGENCE

(71) Applicant: Siemens Aktiengesellschaft, Munich (DE)

(72) Inventors: Bernd Roppelt, Unterhaid (DE); Jens Schmenger, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/023,021

(22) PCT Filed: Jun. 22, 2021

(86) PCT No.: PCT/EP2021/066980
§ 371 (c)(1),
(2) Date: Feb. 24, 2023

(87) PCT Pub. No.: WO2022/042897
PCT Pub. Date: Mar. 3, 2022

(65) Prior Publication Data
US 2023/0244585 A1 Aug. 3, 2023

(30) Foreign Application Priority Data
Aug. 26, 2020 (EP) .................................. 20192872

(51) Int. Cl.
*G06F 11/30* (2006.01)
(52) U.S. Cl.
CPC ............................... *G06F 11/3062* (2013.01)
(58) Field of Classification Search
CPC ....... G06F 11/3062; G01K 7/425; G01K 3/00
See application file for complete search history.

(56) References Cited

U.S. PATENT DOCUMENTS 5,461,766 A * 10/1995 Burward-Hoy ..... H01L 23/3675
29/890.036
5,815,921 A * 10/1998 Burward-Hoy ..... H01L 23/3672
29/890.036

(Continued)

FOREIGN PATENT DOCUMENTS

| CN | 1844905 A | 10/2006 |
| CN | 1942982 A | 4/2007 |

(Continued)

OTHER PUBLICATIONS

Alex Krizhevsky, Ilya Sutskever, and Geoffrey E. Hinton. 2012. ImageNet classification with deep convolutional neural networks. In: Proceedings of the 25th International Conference on Neural Information Processing Systems—vol. 1 (NIPS'12). Curran Associates Inc., Red Hook, NY, USA, 1097-1105.

(Continued)

*Primary Examiner* — Tung S Lau
(74) *Attorney, Agent, or Firm* — Henry M. Feiereisen LLC (57) ABSTRACT

A method for determining soiling of a heat sink for cooling an electronic component is disclosed. A load curve controlled by the component and a temperature curve along a heat transfer chain from the at least one component to the heat sink are continuously captured. In a training phase, a decision function is determined, which is provided for application to a portion of the load curve and to at least one correspondingly captured portion of a temperature curve. In a classification phase, a non-soiled state of the heat sink is detected when the portion of the load curve presented to the decision function is similar to the portions of the load curve captured in the training phase and when the at least one corresponding portion of a temperature curve is similar to (Continued)

the portions of the temperature curve in question that were correspondingly captured in the training phase.

20 Claims, 4 Drawing Sheets (56) References Cited

U.S. PATENT DOCUMENTS

| | | | | |
|---|---|---|---|---|
| 6,581,388 | B2* | 6/2003 | Novotny | H10N 10/13 |
| | | | | 62/3.4 |
| 7,447,025 | B2* | 11/2008 | Chen | H01L 23/427 |
| | | | | 257/E23.099 |
| 10,852,069 | B2* | 12/2020 | Poltorak | F28G 1/16 |
| 2003/0097846 | A1* | 5/2003 | Novotny | H01L 23/38 |
| | | | | 62/3.7 |
| 2004/0248146 | A2* | 12/2004 | Atwood | B01L 3/50851 |
| | | | | 435/6.1 |
| 2007/0097637 | A1* | 5/2007 | Chen | H01L 23/467 |
| | | | | 257/E23.099 |
| 2008/0059111 | A1* | 3/2008 | Sri-Jayantha | G06F 1/206 |
| | | | | 702/132 |
| 2008/0272924 | A1 | 11/2008 | Schierling | |
| 2009/0155765 | A1* | 6/2009 | Atwood | B01L 7/52 |
| | | | | 435/286.1 |
| 2010/0252547 | A1* | 10/2010 | Timans | F27B 5/04 |
| | | | | 219/390 |
| 2013/0155611 | A1 | 6/2013 | Yang et al. | |
| 2014/0014313 | A1* | 1/2014 | Hong | F28F 27/00 |
| | | | | 165/185 |
| 2014/0161152 | A1 | 6/2014 | Kuhn | |
| 2015/0032404 | A1 | 1/2015 | Bohllander et al. | |
| 2015/0148981 | A1* | 5/2015 | Kong | G05D 23/1917 |
| | | | | 700/299 |
| 2015/0330924 | A1 | 11/2015 | Budde | |
| 2018/0004864 | A1* | 1/2018 | Chainer | F24F 11/30 |
| 2020/0200580 | A1 | 6/2020 | Hornung et al. | |

FOREIGN PATENT DOCUMENTS

| | | |
|---|---|---|
| CN | 103718406 A | 4/2014 |
| CN | 109596664 A | 4/2019 |
| CN | 109946510 A | 6/2019 |
| CN | 111351539 A | 6/2020 |
| CN | 111351678 A | 6/2020 |
| DE | 102016011488 A1 | 3/2017 |
| EP | 3499707 A1 | 6/2019 |
| JP | H07244007 A | 9/1995 |
| WO | WO 2011085939 A1 | 7/2011 |
| WO | WO 2014105031 A2 | 7/2014 |

OTHER PUBLICATIONS

Warren Liao, T. (2005): Clustering of time series data—a survey. In: Pattern Recognition 38 (11), S. 1857-1874. DOI: 10.1016/j.patcog. 2005.01.025.

* cited by examiner

METHOD FOR DETERMINING HEAT-SINK CONTAMINATION BY MEANS OF ARTIFICIAL INTELLIGENCE

CROSS-REFERENCES TO RELATED APPLICATIONS

This application is the U.S. National Stage of International Application No. PCT/EP2021/066980, filled Jun. 22, 2021, which designated the United States and has been published as International Publication No. WO 2022/042897 A1 and which claims the priority of European Patent Application, Serial No. 20192872.8, filed Aug. 26, 2020, pursuant to 35 U.S.C. 119 (a)-(d).

BACKGROUND OF THE INVENTION

The invention relates to a method for determining the contamination of a heat sink which is provided for cooling at least one electronic component.

Power-electronic devices, for example inverters or power stages of motor controls, are provided with heat sinks, from which heat is dissipated by air passing in a cooling channel. For surface enlargement, such heat sinks have cooling fins which project into the cooling channel and around which the air flows in a longitudinal direction.

In order to optimize the heat dissipation, the heat sink surface is increased with increasing power density, for example in the case of high-performance frequency inverters or servo inverters, by reducing the distance between the cooling fins. As a result, a larger number of cooling fins and thus also a larger surface can be provided for the heat exchange in the cooling channel.

With the air sucked in for heat dissipation, dirt particles, which are deposited in the cooling channel and between the cooling fins, are inevitably also sucked in. As a result, the heat transfer from the cooling fins to the air flowing past is reduced. In addition, the flow velocity of the air in the region between the cooling fins is reduced. As a result of these dirt deposits, overall the cooling effect of the heat sink deteriorates.

It is thereby possible that, in an operating mode of the power electronic device, which is associated with a particularly high power loss, the waste heat which is then produced can no longer be adequately dissipated by the heat sink.

In order to avoid a failure or overheating of the power electronic device, it is therefore necessary to regularly examine the level of contamination of the heat sink, for example by means of a manual inspection of the heat sink.

WO 2014/105031 A2 discloses methods and systems for detecting and identifying faults in air-cooled systems. The systems and methods use, for example, a prediction model which is based on an energy balance relationship, and with which target values for temperatures and/or air flow rates are calculated, with which temperatures and/or air flow rates detected on an air-cooled system are compared for error detection.

US 2013/155611 A1 discloses an electronic device having a heat sink arranged on a base plate and a dust cleaning apparatus. The dust cleaning apparatus is arranged on the base plate so as to be displaceable relative to the heat sink in order to sweep dust on the heat sink into a dust collection box.

CN 111 351 678 A discloses an apparatus and a method for checking the cooling of a power transformer. In the method, temperatures of different parts of the transformer are detected in the event of different contamination, if the transformer has no cooling equipment, and are stored in a temperature database. These temperatures are compared with temperatures of an oil-cooling liquid of a cooling circuit of the transformer under operating conditions of the transformer.

JP H07 244007 A discloses a contamination detector with an electronic cooling apparatus and a sample substrate, the surface of which can be moistened with a condensate by the cooling apparatus. Electrodes are arranged on the sample substrate, between which an electrical resistance is measured when the sample substrate is moistened. Contamination of the sample substrate is determined from the electrical resistance.

The object of the invention is to specify an improved method for determining the contamination of a heat sink provided for cooling at least one electronic component.

SUMMARY OF THE INVENTION

The object is achieved according to the invention with a method as set forth hereinafter.

Advantageous embodiments of the invention are the subject matter of the subclaims.

In a method for determining the contamination of a heat sink provided for cooling at least one electronic component, a load profile is continuously detected for the at least one electronic component.

The load profile can be detected by an electrical load as the time profile of the output current controlled by the at least one electronic component. The electrical load can be designed, for example, as an electric motor. However, other electrical loads through which such an output current flows are also possible.

Alternatively or additionally, the load profile can be detected as a thermal load profile by the time profile of at least one temperature which, as explained in more detail below, is measured along a heat transfer chain from the at least one electronic component to the heat sink.

At least one temperature sensor detects at least one temperature profile which indicates the time profile of a temperature along a heat transfer chain from the at least one component to the heat sink. The temperature sensor can be arranged in the immediate vicinity of the at least one electrical component, for example on a substrate bearing the at least one electrical component. However, it is also possible to arrange a temperature sensor on the heat sink or on a thermal bridge between the at least one component and the heat sink.

In an embodiment having a plurality of temperature sensors, a thermal load profile is determined from at least one temperature difference which is determined along the heat transfer chain between various temperature sensors, and which is dependent on the heat flow transmitted along the heat transfer chain. The thermal load profile is determined on the basis of a difference between a first temperature profile, which is detected by a first temperature sensor, and at least one further temperature profile, which is detected by a further temperature sensor.

As a result, it is possible to detect a load profile even without measuring an electrical parameter.

In a training phase, learning sections, that is to say, time intervals within the training phase, are determined on an uncontaminated heat sink. The learning sections are determined in such a way that the load profile, which is detected in each case within such a time interval or learning section, is very similar to the load profile in other learning sections.

A similar prototypical load profile section is determined from the plurality of such load profile sections similar to one another.

In particular, learning sections are determined in such a way that load profiles in learning sections are more similar to one another than to load profiles outside learning sections and/or are more similar to one another than load profiles in arbitrarily selected time intervals of the training phase outside of such learning sections.

The training phase is carried out in an installation and operating state which is provided for the permanent operation of the power electronics with the at least one electronic component and the at least one heat sink. In particular, the training phase is carried out in an installation and operating state as found in an operator or user of the power electronics, Et is not necessary or envisaged that the training phase is carried out under standardized conditions at a manufacturer of power electronics.

For each of the learning sections, in each case a section of the at least one temperature profile is detected which has been measured by the at least one temperature sensor in this learning section.

A decision function is determined from the plurality of sections of the load profile and in each case of the at least one temperature profile assigned to the learning sections. This decision function is intended for application to a section of the load profile and to at least one section of a temperature profile which has been recorded corresponding to this section of the load profile.

The decision function is determined in such a way that an uncontaminated state of the heat sink is detected when the presented section of the load profile is similar to the sections of the load profile detected in the learning sections, and when the presented at least one section of a temperature profile is similar to the sections of the at least one temperature profile detected in the learning sections.

The decision function is also determined in such a way that otherwise a contaminated state of the heat sink is detected.

In a subsequent classification phase, classification sections are determined in such a way that they have sections of the load profile which are similar to at least one section of the load profile which is assigned to a learning section.

In other words: the learning sections determined in the training phase are compared as a template against the continuously detected load profile and a time interval in the classification phase is then segmented as a classification section if the load profile in this classification section is sufficiently similar to one, preferably to a plurality of load profiles that were detected in the learning sections.

The sections of the load profile and of the at least one temperature profile which are each assigned to a classification section are presented to the decision function which was determined in the training phase. The contamination state of the heat sink is detected by means of the decision function.

An advantage of the method according to the invention is that it is determined by means of the decision function whether, for approximately equal load situations, a temperature profile has been established which is changed with respect to the reference situation in the training phase (with an uncontaminated heat sink) and which is characteristic of contamination of the heat sink.

By comparison with a reference situation with unchanged installation and operating state, the method is independent of customized adaptions of the installation state, for example of the air conditioning or air supply or ventilation. This makes it possible to determine the contamination state more accurately than with methods which apply a criterion for a load and temperature profile which is independent of the individual installation state.

A further advantage of the method is that it operates independently of a specific calibration load profile which can rarely or never occur during operational operation. It is not necessary to specifically provoke a calibration load profile in order to obtain a statement about the degree of contamination. The method according to the invention can therefore be used continuously and without additional calibration and operating expense. As a specific provocation test is not required, the method enables higher temporal accuracy in the detection of contamination events in continuous operation.

An advantage over manual inspection methods is the reduced maintenance effort and the temporally more accurate detection of contamination events.

In one embodiment, a temperature profile is detected in each case by a plurality of temperature sensors. By virtue of the plurality of the temperature profiles thus detected, an improved assessment of the behavior of a heat sink is possible, as in this case the influence of the at least one electronic component on the plurality of temperature sensors can be detected more accurately. For example, it is possible to determine an average temperature profile from the measured values of temperature sensors located approximately equidistantly from the at least one component.

In addition, in this embodiment it is possible to reduce or eliminate external influences on the measured temperature profiles by forming a difference between measured values of temperature sensors which are arranged at different points along the heat transfer path from the at least one electronic component to the heat sink.

In one embodiment, the decision function is formed by determining at least one prototypical temperature section from the plurality of sections of the at least one temperature profile assigned to the learning sections.

In the presentation of the sections of the at least one temperature profile respectively assigned to a classification section, a similarity to the respectively assigned prototypical temperature section is determined according to a predetermined similarity measure.

If the similarity lies below a threshold value, a contaminated state of the heat sink is detected.

The similarity of signal sections, for example the similarity between sections of the load profile and between sections of a temperature profile, can easily be determined on the basis of distance measurements or similarity measures. This embodiment is therefore particularly easy to implement.

In one embodiment, the similarity is determined inversely to the mean square deviation between the at least one temperature profile and the respectively assigned prototypical temperature section. A small square deviation is a reliable and easily calculated measure of similarity of signal sections.

In one embodiment, the similarity is determined inversely to the amount of the maximum time deviation between the at least one temperature profile and the respectively assigned prototypical temperature section. This measure of similarity has particularly great robustness with respect to variations in the at least one temperature profile. This embodiment is therefore particularly robust with respect to variations in the load conditions and/or the air-conditioning conditions.

In one embodiment, the similarity is determined inversely to the exceeding of a maximum value derived from the prototypical temperature section in the at least one temperature profile. In this embodiment, the course (the curve shape) of the prototypical temperature section is not included in the determination of similarity. This similarity measure therefore has particularly great robustness with respect to variations in the at least one temperature profile. This embodiment is therefore particularly robust with respect to variations in the load conditions and/or the air-conditioning conditions.

In one embodiment, the decision function is determined by a machine learning method.

With machine learning methods, complex decision functions can be determined for which little or no explicit prior knowledge (which can be formulated as decision-making rules) is available if a sufficiently large set of learning data describing the intended behavior of such decision functions is available.

In the present case, such learning data can be obtained to a particularly large extent from the continuous operation of a power electronics system by segmenting signal sections from the continuously measured load profile and one or more continuously measured temperature profiles in the training phase.

By means of this learning data, a particularly accurate decision function for determining the contamination of a heat sink can be determined by means of a machine learning method. For example, a decision function can be determined which not only permits a binary distinction (contaminated or uncontaminated heat sink), but also a categorical assessment (for example, heat sinks which have no/little/moderate/strong contamination) and/or a numerical assessment (for example, indication of a probability of failure for the cooling function or indication of a remaining operating time).

It is also possible to adapt this decision function incrementally and/or iteratively. For example, the decision function can be retrained if the installation situation of the power electronics, for example, has been changed by additional air-conditioning of a control cabinet.

As a result, a particularly flexible, robust and at the same time accurate assessment of the contamination state of a heat sink is possible.

In one embodiment of the method, the learning sections are determined by clustering sections of the load profile. Clustering refers to methods of unsupervised machine learning in which a plurality of feature vectors is mapped by a prototypical feature vector (prototype) such that two feature vectors which are assigned to the same prototype have a higher similarity than two feature vectors assigned to different prototypes Methods for clustering signals are known, for example, from the publication Warren Liao, T. (2005): Clustering of time series data—a survey. In: Pattern Recognition 38 (11), p. 1857-1874. DOI: 10.1016/j.patcog.2005.01.025.

This embodiment enables a particularly accurate and reliable construction of a decision function for determining the contamination. In addition, a manual determination of learning sections in this embodiment is not required.

In one embodiment, the decision function is formed by training a deep convolutional neural network by means of a deep learning method on the basis of feature vectors which are determined from the sections of the load profile and the temperature profile respectively assigned to the learning sections.

Classifiers referred to as deep convolutional neural networks and learning methods referred to as deep learning for adapting such classifiers in such a way that a decision function which is optimal in the sense of a learning error criterion is formed are known from the prior art, for example from the publication Alex Krizhevsky, Ilya Sutskever, and Geoffrey E. Hinton. 2012. ImageNet classification with deep convolutional neural networks. In: Proceedings of the 25th International Conference on Neural Information Processing Systems—Volume 1 (NIPS'12). Curran Associates Inc., Red Hook, NY, USA, 1097-1105.

This embodiment enables a particularly accurate and reliable determination of the contamination of a heat sink.

In one embodiment, improved heat dissipation of a heat sink is detected in that a section of at least one temperature profile is detected in a classification section and compared with at least one section of a temperature profile in at least one learning section, the sections of the load profile respectively assigned to the classification section and the learning section being similar to one another. Improved heat dissipation is determined from the fact that the temperature profile in the classification section is at least partially below the assigned temperature profile (determined for an identical or similar load profile) of the at least one learning section.

As a result, it is possible to detect improved heat dissipation compared to the training phase, which can be effected, for example, by cleaning the heat sink and/or by air conditioning the surroundings of the heat sink.

In this embodiment of the method, it is optionally possible to carry out a new training phase with the changed (improved) heat dissipation, for example with a freshly cleaned heat sink or in a control cabinet which is now air-conditioned. As a result, the detection of a contaminated heat sink always remains related to an approximately optimal or at least good heat dissipation situation and thus improves the sensitivity of the method when detecting a contaminated heat sink state.

The above-described properties, features and advantages of this invention and the manner in which these are achieved, will become clearer and more fully understood in conjunction with the following description of exemplary embodiments, which will be explained in connection with the drawings. It is shown hereby in:

DETAILED DESCRIPTION OF PREFERRED EMBODIMENTS

Parts corresponding to one another are provided with the same reference characters in the figures.

Figure 1:
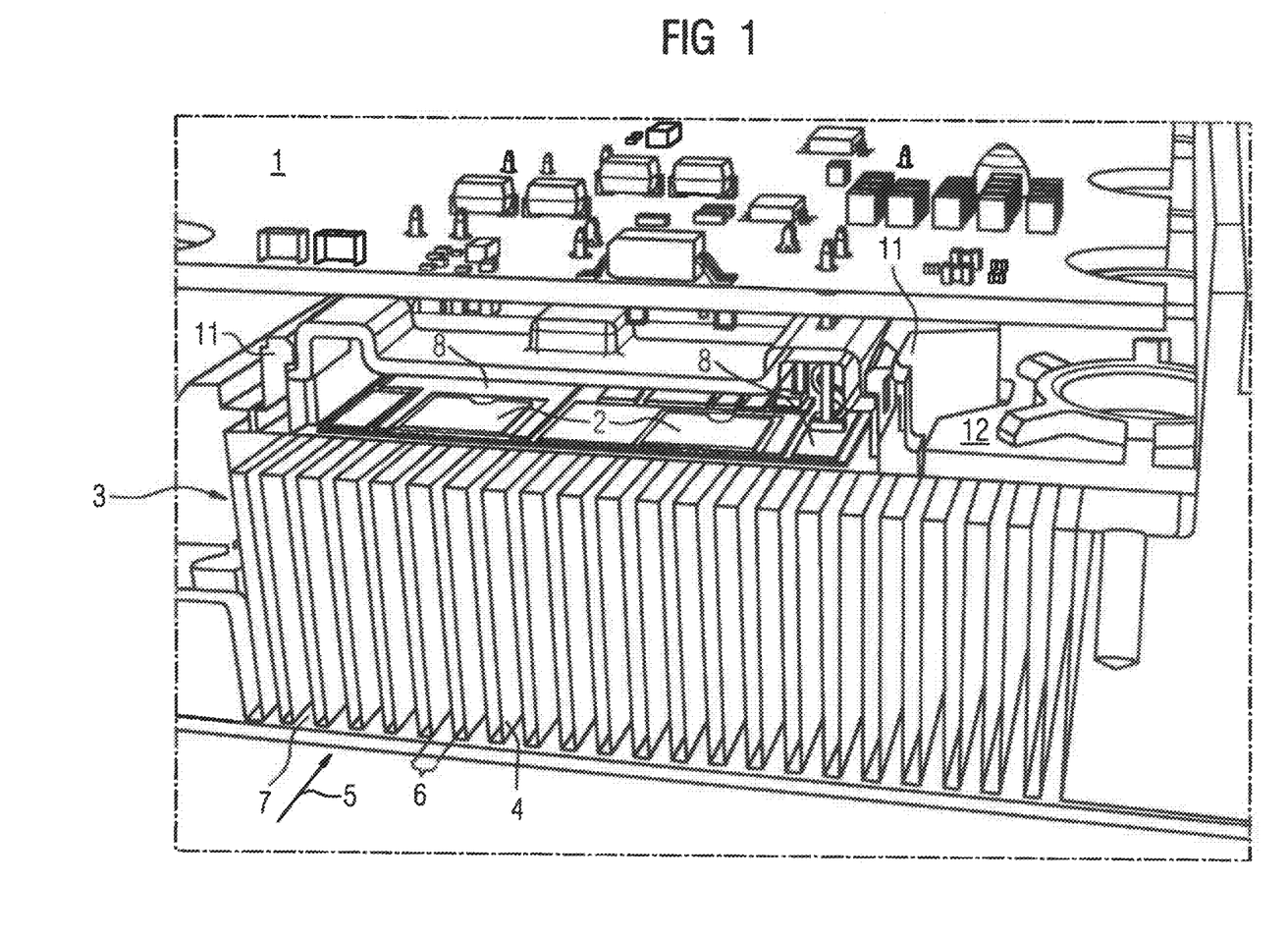
FIG. 1 a diagrammatic plan view of a printed circuit board with power electronic components and a heat sink, FIG. 2 a diagrammatic plan view of a printed circuit board with power electronic components, FIG. 3 a diagrammatic view of a calibration load profile and assigned calibration temperature profiles and FIG. 4 a diagrammatic view of a load profile and assigned temperature profiles.

FIG. 1 shows a printed circuit board 1 which is connected to a heat sink 3 having power electronic components 2. The power electronic components 2 are arranged on a substrate 8 between the printed circuit board 1 and the heat sink 3 and are enclosed in a housing 11 which can be designed, for example, as a potting compound frame.

The power electronic components 2 are connected to the heat sink 3 In a heat-conducting manner. On its side facing the power electronic components 2, the heat sink 3 has a planar metallic heat-receiving plate 9 which extends over the entire base area and is illustrated and described in more detail in FIG. 2.

From the side facing away from the power electronic components 2, cooling fins 4 project vertically from the heat sink 3 and extend parallel to the direction of flow 5 of the air conducted through the cooling fin intermediate spaces 6 for cooling. The entirety of the cooling fin intermediate spaces 6 forms the cooling channel 7.

The substrate 8 is designed as a ceramic plate laminated with copper on both sides and bears the power electronic components 2 on one component side. Conductor tracks are etched free on the component side in accordance with the electrical connections provided between the power electronic components 2.

The thermal contact side of the substrate 8 opposite the component side is copper-laminated over its entire surface and soldered to the heat-receiving plate 9 of the heat sink 3, However, other connection techniques and arrangements are also possible which ensure a low heat transfer resistance between the power electronic components 2 and the heat sink 3, for example by screwing or by form-fitting connection using heat-conducting paste.

Figure 2:
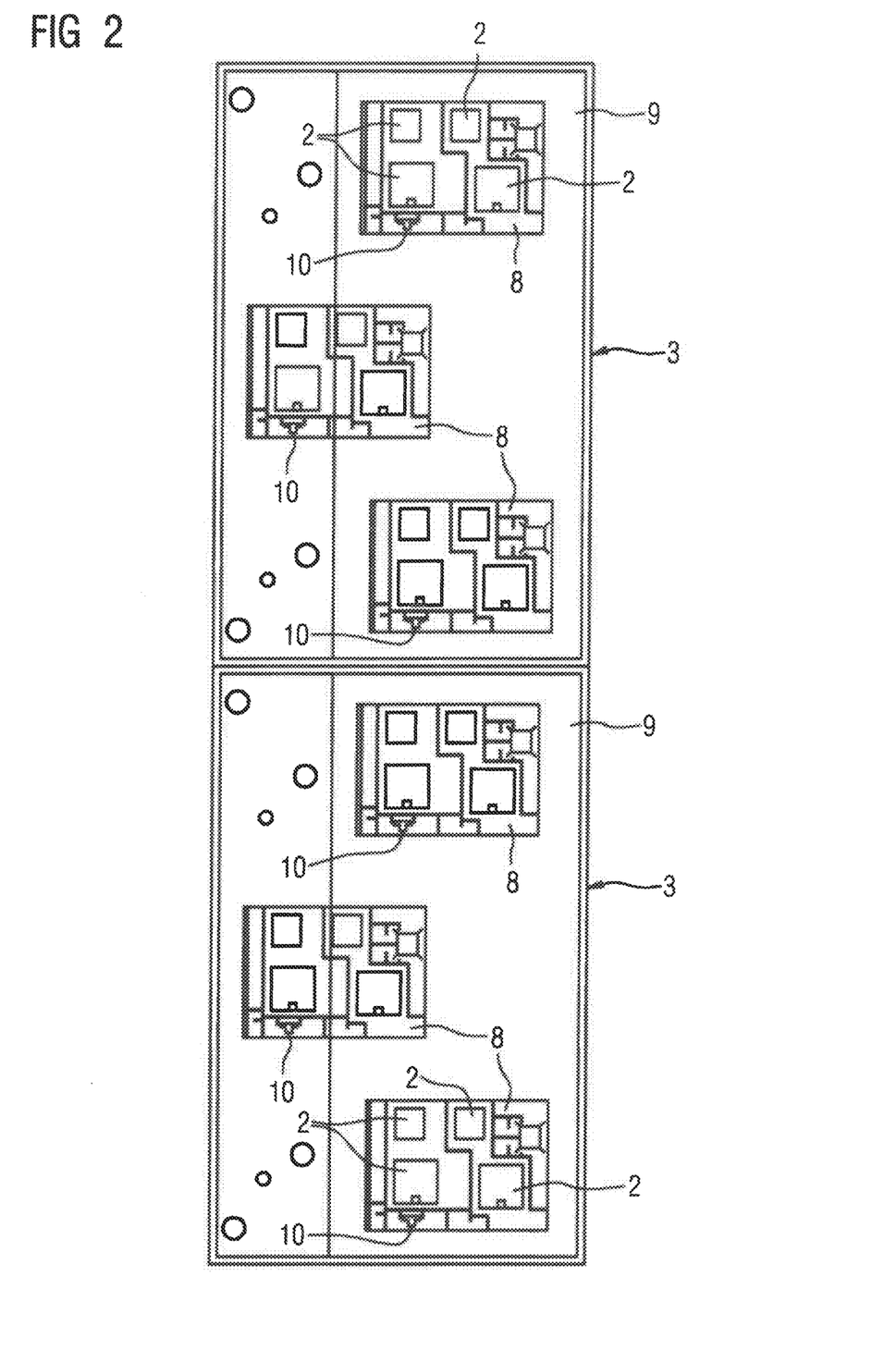

Depending on the function of the power electronics, the power electronic components 2 can be designed, for example as a bipolar transistor with an insulated gate bipolar transistor (IGBT) and/or as a diode and can be arranged on the substrate 8, as is illustrated in more detail in FIG. 2 in a diagrammatic plan view of the heat-absorbing surface 9.

The heat loss released by the power electronic components 2 is transferred through the ceramic layer of the substrate 8 to the heat sink 3 and discharged via its cooling fins 4 to the air flowing past.

In the present exemplary embodiment, two heat sinks 3 are arranged above a printed circuit board 1, In each case, one heat sink 3 is configured for the heat dissipation of a plurality of power electronic components 2 which are arranged on three substrates 8 of identical structure and design. A temperature sensor 10 is arranged on each of the substrates 8 in the immediate vicinity of the power electronic components 2.

The temperature sensor 10 measures the temperature of the respective substrate 8, which is approximately equal to the temperature of the heat-absorbing surface gin the region covered by the substrate 8.

A load change, in other words, a change in the output current controlled by the power electronic components 2 of a substrate 8, brings about a change in the substrate temperature detected by the respective temperature sensor 10, the temperature change generally being attenuated and delayed with respect to the load change.

The relationship between the load change and the temperature change includes, inter alia, the heat transfer resistance between the power electronic components 2 and the substrate 8, the heat transfer resistance between the substrate 8 and the heat sink 3 and the heat flow carried away via the cooling channel 7. This relationship is therefore significantly determined by the installation situation of the printed circuit board 1.

Figure 3:
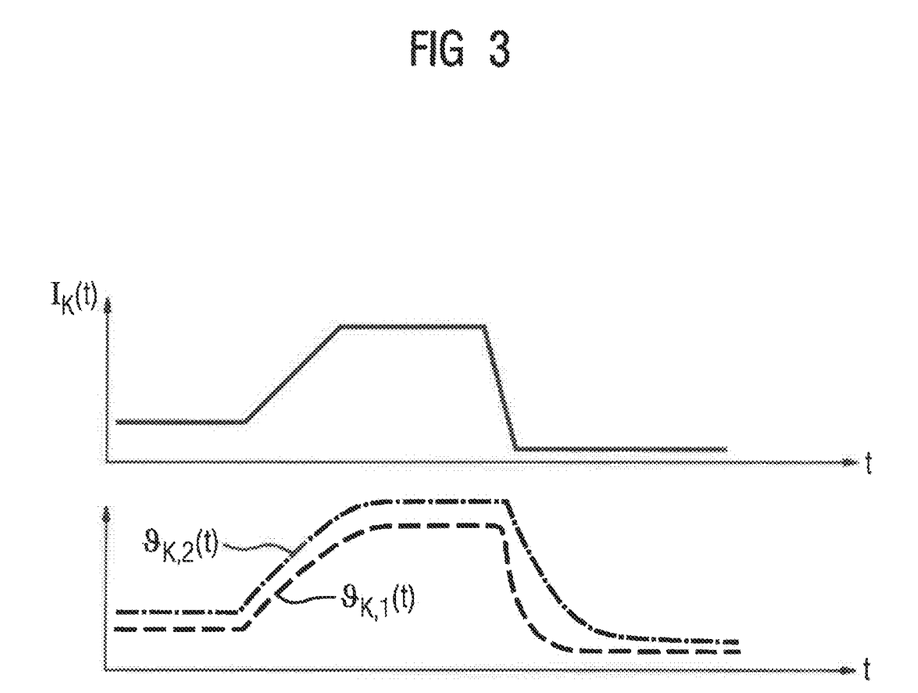

FIG. 3 shows a diagrammatic view of a calibration load profile $I_K(t)$ and a first and a second calibration temperature profile $\vartheta_{K,1}(t)$, $\vartheta_{K,2}(t)$ as a function of time t. The first calibration temperature profile $\vartheta_{K,1}(t)$ is recorded for a printed circuit board 1 installed in an air-conditioned control cabinet when the calibration load profile $I_K(t)$ is applied. The second calibration temperature profile $\vartheta_{K,2}(t)$ deviating therefrom is recorded for a printed circuit board 1 in an un-air-conditioned installation position with the same application to the calibration load profile $I_K(t)$.

The calibration temperature profile $\vartheta_{K,1}(t)$, $\vartheta_{K,2}(t)$ of a substrate 8 can depend not only on the calibration load profile $I_K(t)$ and on the installation situation of the printed circuit board 1 but also on the aging of the power electronic components 2, in particular on the load-dependent power loss which can be varied as a function of aging. In addition, the calibration temperature profile $\vartheta_{K,1}(t)$, $\vartheta_{K,2}(t)$ on a first substrate 8 is also determined by the load profile on other substrates 8 which are cooled via the same heat sink 3.

In addition, a load profile in an actual operation of the printed circuit board 1 typically deviates from the calibration load profile $I_K(t)$. As the power loss of a power electronic component 2, for example an IGBT transistor, also depends on its temperature, positive feedback effects occur during heating, which make the transfer of the calibration temperature profile $\vartheta_{K,1}(t)$, $\vartheta_{K,2}(t)$ determined for the calibration load profile $I_K(t)$ to a different load profile more difficult or impossible.

In general, it is therefore not possible to determine an air flow reduced by contamination in a cooling channel 7 or a heat transfer resistance impaired by contamination between a heat sink 3 and the circulating air solely from the calibration temperature profile $\vartheta_{K,1}(t)$, $\vartheta_{K,2}(t)$, which is measured by a temperature sensor 10 on a substrate 8, the components 2 of which are exposed to the calibration load profile $I_K(t)$.

Figure 4:
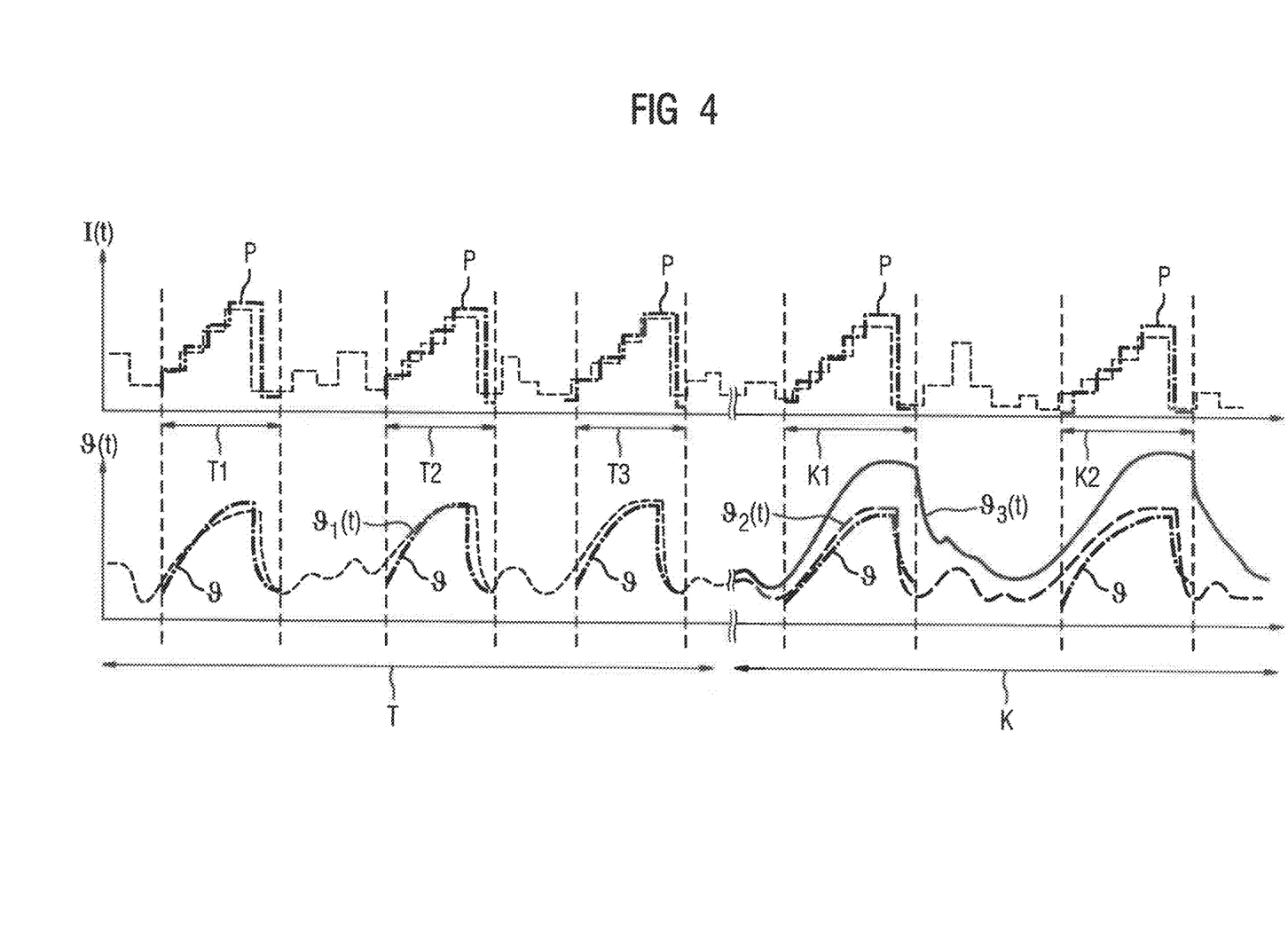

FIG. 4 shows a diagrammatic view of a load profile I(t) during the operational operation of the power electronic device with an installation state of the printed circuit board 1, which is not known in more detail, as well as the profile of the temperature measured at a temperature sensor 10.

In a training phase T, the load profile I(t) and a synchronously measured first temperature profile $\vartheta_1(t)$ are detected. The training phase T is selected and dimensioned in such a way that heat sinks 3 do not become contaminated during the training phase T, or only to such a small extent that the function of the heat sinks 3 is not impaired.

By means of an unsupervised machine learning method, learning sections T1 to T3 are segmented, in which the load profile I(t) is approximately equal to a typical, recurring load profile section P.

Learning sections T1 to T3 are preferably segmented in such a way that the assigned load profile section P occurs repeatedly particularly frequently and differs particularly well from other sections of the load profile I(t).

In this case, it is not necessary for the sections of the load profile I(t) assigned to the learning sections T1 to T3 to be identical to one another and to the load profile section P. It is sufficient if, after a predetermined distance or similarity metric, these sections have a significantly higher similarity to one another than other sections of the load profile I(t) selected at random, preferably a statistically significantly increased similarity.

From the plurality of such segmented learning sections T1 to T3, the prototypical load profile section P is determined, for example, by averaging or by means of a cluster method.

Segmentation and cluster methods for identifying learning sections T1 to T3 and for determining a prototypical load profile section P are known from the prior art.

Each learning section T1 to T3 is also assigned a section of the first temperature profile NO. Analogously to the determination of the prototypical load profile section, a prototypical temperature section $\vartheta$ is determined from the plurality of these sections, for example by averaging or clustering.

The training phase T is followed by a classification phase K, in which the contamination state of the heat sink 3 is initially unknown and is determined using the method according to the invention.

For this purpose, classification sections K1, K2 are segmented within the classification phase K in such a way that the load profile I(t) in each of these classification sections K1, K2 has a large, preferably statistically significant similarity to the load profile section P, which was determined in the training phase T.

Each of the classification sections K1, K2 is also assigned a section of a temperature profile $\vartheta_2(t)$, $\vartheta_3(t)$, which is determined, inter alia, by the load profile I(t) in and immediately before the classification section K1, K2 and by the heat dissipation of the heat sink.

By way of example, FIG. 4 shows a second temperature profile $\vartheta_2(t)$ for slight contamination of the heat sink 3 and an alternative third temperature profile $\vartheta_3(t)$ for severe contamination of the heat sink 3.

In the case of slight contamination, the second temperature profile $\vartheta_2(t)$ does not deviate, or deviates only slightly, from the determined prototypical temperature section $\vartheta$ in a classification section K1, K2, in the sense of a predetermined distance measure, as the heat sink 3 is cooled approximately as well as in the training phase T.

In the case of severe contamination, however, the third temperature profile $\vartheta_3(t)$ in a classification section K1, K2 deviates comparatively more strongly from the prototypical temperature section $\vartheta$ as the heat dissipation of the heat sink 3 has changed (decreased) compared to the training phase T.

For the determination of the deviation between a temperature profile $\vartheta_2(t)$, $\vartheta_3(t)$ in a classification section K1, K2 and the prototypical temperature section $\vartheta$, for example, the time-averaged quadratic deviation or the absolute value of the time deviation is possible as a distance measure.

For example, the amount of the difference between the maximum temperature value in the classification section K1, K2 and the maximum temperature value of the prototypical temperature section a can also be used as a simple distance measure.

Derived distance measures are also possible, which are determined, for example, on the basis of time constants of decaying exponential functions which are adapted to sections of the temperature profile $\vartheta_2(t)$, $\vartheta_3(t)$ in a classification section K1 K2.

As shown in FIG. 4, in general neither the second nor the third temperature profile $\vartheta_2(t)$, $\vartheta_3(t)$ in a classification section K1, K2 coincide perfectly, that is to say: congruently, with the prototypical temperature section $\vartheta$.

Minor differences between the second temperature profile $\vartheta_2(t)$ and the prototypical temperature section $\vartheta$ can be attributed, for example, to the aging of the power electronic components 2, to the heat transfer from a substrate 8 to the heat-absorbing surface 9 of the heat sink 3 altered by aging or degradation of, for example, soldered connections.

On the other hand, strong contamination of the cooling fin intermediate spaces 6 brings about a comparatively greater deviation of the third temperature profile $\vartheta_3(t)$ from the prototypical temperature section $\vartheta$. In particular, such strong contamination can bring about a steeper increase in temperature in the event of a load increase, a temperature profile $\vartheta_3(t)$ shifted upward (toward higher temperatures) and/or a delayed, flatter drop in temperature in the event of a load drop.

The deviation of a temperature profile $\vartheta_2(t)$, $\vartheta_3(t)$ in classification sections K1, K2 can thus be compared with a threshold value. If such a threshold value is exceeded, contamination of the heat sink 3 that must be eliminated is detected. It is also possible to determine statistical measures for exceeding the threshold value. Contamination can thus be detected when the deviation in a certain relative proportion of the classification sections K1, K2—for example in at least 10% of the detected classification sections K1, K2—exceeds a predetermined threshold value.

It is also possible to use classifiers for detecting and/or quantifying a degree of contamination of a heat sink 3 instead of or in addition to one such threshold value criterion. The decision function, that is to say: the distinction between a contaminated and an uncontaminated state on the basis of a section of a temperature profile $\vartheta_2(t)$, $\vartheta_3(t)$ and the corresponding sections of a load profile I(t), can be formed by adapting such a classifier to the sections of the load profile I(t) and the temperature profile $\vartheta_1(t)$ respectively detected in the learning sections T1 to T3.

The learning sections T1 to 13 are transformed into feature vectors. A feature vector can be formed, for example, as a set of sample values of the load profile I(t) and sample values of the temperature profile $\vartheta_1(t)$. A feature vector can also or additionally comprise spectral features, for example one or more band powers in predetermined frequency bands. A feature vector can also or additionally comprise statistical features, for example a mean value, a standard deviation and/or statistical moments of a higher order.

By means of feature vectors obtained in this way, which describe the learning sections T1 to T3, at least one classifier is adapted (trained) in that a learning error criterion is minimized by a training algorithm.

Such classifiers can be formed, for example, by adapting a linear or quadratic discriminant function, Methods of linear and quadratic discriminant analysis are known from the prior art.

Such classifiers can also be formed by adapting multilayer neural networks, Deep learning methods for adapting neural networks with a particularly large number of hidden layers, which are particularly suitable for the classification of signals and images, are likewise known from the prior art.

In the classification phase K, feature vectors are formed for the classification sections K1, K2 in the same manner as for the learning sections T1 to T3 in the training phase T. By means of a trained (adapted) classifier, each of these feature vectors is assigned a classification value which describes the probability and/or the degree of contamination of the heat sink 3.

The method was explained on the basis of a single prototypical load profile section P, which was determined from a plurality of learning sections T1 to T3 with a similar load profile I(T). In an analogous manner, however, it is also possible to determine further prototypical load profile sections (likewise not shown in detail in FIG. 4) from further learning sections (not shown in detail in FIG. 4) and to use them for evaluating the state of contamination of a heat sink 3.

Furthermore, the method was explained on the basis of a single load profile I(t) and a temperature profile $\vartheta_1(t)$, $\vartheta_2(t)$, $\vartheta_3(t)$ detected by a single temperature sensor 10. However, it is also possible for a plurality of temperature profiles $\vartheta_1(t)$, $\vartheta_2(t)$, $\vartheta_3(t)$ to be detected in parallel with a single substrate 8, which is acted upon by a load profile I(t), by measurement with a plurality of temperature sensors 10. Furthermore, it is also possible for various power electronic components 2 to be acted upon by independent load profiles I(t) and, in parallel with this, for a plurality of temperature profiles $\vartheta_1(t)$, $\vartheta_2(t)$, $\vartheta_3(t)$ to be detected by measurement using a plurality of temperature sensors 10.

Such multivariate signals can also be converted into feature vectors, used for training classifiers and presented to a trained classifier for detecting a degree of contamination.

Although the invention has been illustrated and described in more detail by preferred exemplary embodiments, the invention is not limited by the disclosed examples and other variations may be derived therefrom by a person skilled in the art without departing from the scope of the invention.

What is claimed is:

1. A method for determining contamination of a heat sink provided for cooling an electronic component, the method comprising:
    determining with at least one temperature sensor for the heat sink having the electronic component at least one temperature profile of a temperature along a heat transfer chain from the electronic component to the heat sink for a load profile of the electronic component;
    in a learning phase, determining of a prototype uncontaminated heat sink, which is defined as a heat sink as supplied to a user for permanent operation of the electronic component in an installation, load profile sections in the component of a heat sink under test whose contamination is to be determined;
    determining, from the load profile for the electronic component of the heat sink under test and the at least one temperature profile of the learning sections, a decision function;
    based on the determined decision function, ascertaining that the heat sink under test is equivalent to the prototype uncontaminated heat sink when for a section of the load profile for the electronic component of the heat sink under test that corresponds to a corresponding section of the load profile of the prototype uncontaminated heat sink at least one corresponding section of a temperature profile of the heat sink under test is similar to the corresponding section of the respective temperature profile of the prototype uncontaminated heat sink based on a similarity measure having a threshold value that is inversely proportional to a mean square deviation between the at least one temperature profile and the respectively assigned temperature section of the prototype uncontaminated heat sink, and a threshold value that is inversely proportional to an amount of a maximum time deviation between the at least one temperature profile and the respectively assigned temperature section of the prototype uncontaminated heat sink, and ascertaining that the heat sink is contaminated when the section of the load profile for the electronic component of the heat sink under test is different from the corresponding section of the load profile of the prototype uncontaminated heat sink and the at least one corresponding section of a temperature profile of the heat sink under test is different from the sections of the respective temperature profile of the prototype uncontaminated heat sink;
    determining in a subsequent classification phase, classification sections corresponding to sections of the load profile that are similar to at least one section of the load profile assigned to a learning section based on the similarity measure;
    comparing the temperature profile assigned to a classification section of the heat sink under test to the decision function determined in the training phase; and
    detecting a contamination state of the heat sink by a distance measure of the decision function.

2. The method of claim 1, further comprising detecting the load profile by an electrical load as a time profile of an output current controlled by the at least one electronic component.

3. The method of claim 1, further comprising determining the load profile as a thermal load profile based on at least one difference between a first temperature profile, which is detected with a first temperature sensor, and at least one further temperature profile, which is detected by a further temperature sensor.

4. The method of claim 1, further comprising detecting a plurality of temperature profiles by a plurality of temperature sensors.

5. The method of claim 1, further comprising determining the decision function by a method of machine learning.

6. The method of claim 5, further comprising determining the learning sections by clustering of sections of the load profile.

7. The method of claim 5, further comprising forming the decision function by training a deep convolutional neural network by a deep learning method based on feature vectors which are determined from the sections of the load profile and of the temperature profile respectively assigned to the learning sections.

8. The method of claim 1, further comprising determining improved heat dissipation of the heat sink by detecting, in a classification section with an assigned section of the load profile, a section of a temperature profile which lies at least partially below a section of a temperature profile which has been detected in a learning section with a similar section of the load profile.

9. The method of claim 1, wherein a contamination state of the heat sink is detected when a deviation in a predetermined relative proportion of the classification sections exceeds a predetermined threshold value.

10. The method of claim 9, wherein the predetermined relative proportion of the classification sections comprises at least 10% of the classification sections.

11. A method for determining contamination of a heat sink provided for cooling an electronic component, the method comprising:
    determining with at least one temperature sensor for the heat sink having the electronic component at least one temperature profile of a temperature along a heat transfer chain from the electronic component to the heat sink for a load profile of the electronic component;
    in a learning phase, determining of a prototype uncontaminated heat sink, which is defined as a heat sink as supplied to a user for permanent operation of the electronic component, load profile sections in the component of a heat sink under test whose contamination is to be determined;
    determining, from the load profile for the electronic component of the heat sink under test and the at least one temperature profile of the learning sections, a decision function;
    based on the determined decision function, ascertaining that the heat sink under test is equivalent to the prototype uncontaminated heat sink when for a section of the load profile for the electronic component of the heat sink under test that corresponds to a corresponding section of the load profile of the prototype uncontaminated heat sink at least one corresponding section of a temperature profile of the heat sink under test is similar to the corresponding section of the respective temperature profile of the prototype uncontaminated heat sink based on a similarity measure having a threshold value that is inversely proportional to a mean square deviation between the at least one temperature profile and the respectively assigned temperature section of the prototype uncontaminated heat sink, and a threshold value that is inversely proportional to an exceeding of a maximum value derived from the temperature section of the prototype uncontaminated heat sink in the at least one temperature profile, and ascertaining that the heat sink is contaminated when the section of the load profile for the electronic component of the heat sink under test is different from the corresponding section of the load profile of the prototype uncontaminated heat sink and the at least one corresponding section of a temperature profile of the heat sink under test is different from the sections of the respective temperature profile of the prototype uncontaminated heat sink;

determining in a subsequent classification phase, classification sections corresponding to sections of the load profile that are similar to at least one section of the load profile assigned to a learning section based on the similarity measure;

comparing the temperature profile assigned to a classification section of the heat sink under test to the decision function determined in the training phase; and detecting a contamination state of the heat sink by a distance measure of the decision function.

12. The method of claim 11, further comprising detecting the load profile by an electrical load as a time profile of an output current controlled by the at least one electronic component.

13. The method of claim 11, further comprising determining the load profile as a thermal load profile based on at least one difference between a first temperature profile, which is detected with a first temperature sensor, and at least one further temperature profile, which is detected by a further temperature sensor.

14. The method of claim 11, further comprising detecting a plurality of temperature profiles by a plurality of temperature sensors.

15. The method of claim 11, further comprising determining the decision function by a method of machine learning.

16. The method of claim 15, further comprising determining the learning sections by clustering of sections of the load profile.

17. The method of claim 15, further comprising forming the decision function by training a deep convolutional neural network by a deep learning method based on feature vectors which are determined from the sections of the load profile and of the temperature profile respectively assigned to the learning sections.

18. The method of claim 11, further comprising determining improved heat dissipation of the heat sink by detecting, in a classification section with an assigned section of the load profile, a section of a temperature profile which lies at least partially below a section of a temperature profile which has been detected in a learning section with a similar section of the load profile.

19. The method of claim 11, wherein a contamination state of the heat sink is detected when a deviation in a predetermined relative proportion of the classification sections exceeds a predetermined threshold value.

20. The method of claim 19, wherein the predetermined relative proportion of the classification sections comprises at least 10% of the classification sections.

* * * * *